United States Patent

[11] 3,527,173

| [72] | Inventors | Wallace C. Mullvain, Sr.<br>West Covina, California,<br>John Joch, Jr., West Covina, California,<br>Norman R. Matheus, West Covina,<br>California |
|---|---|---|
| [21] | Appl. No. | 738,921 |
| [22] | Filed | June 21, 1968 |
| [45] | Patented | Sept. 8, 1970 |
| [73] | Assignee | J/G Researched Products, Inc.<br>Los Angeles, California<br>a corporation of California |

[54] DOUGH PANNING DEVICE
9 Claims, 8 Drawing Figs.

[52] U.S. Cl. ............................................. 107/4,
107/9

[51] Int. Cl. .............................................. A21c 7/04

[50] Field of Search .................................. 107/4, 4.2,
4.3, 4.4, 4.5, 7, 7.2, 7.4, 8.2, 8.95, 9, 9.1, 9.2, 9.7,
9.8, 9.9, 54.2, 54.28, 69

[56] References Cited
UNITED STATES PATENTS

| 1,577,130 | 3/1926 | Labeyrie et al. | 107/9.8 |
| 2,590,823 | 3/1952 | Rhodes | 107/7.2X |
| 2,750,899 | 6/1956 | Marasso | 107/9X |
| 2,953,107 | 9/1960 | Marasso | 107/54.2 |

Primary Examiner—Walter A. Scheel
Assistant Examiner—Arthur O. Henderson
Attorney—John Holtrichter, Jr.

ABSTRACT: Open-topped mold means is rotatably mounted intermediate the discharge end of a panning-machine discharge chute and the baking pans for receiving dough pieces from the chute, vibrating the dough pieces to properly position them in the mold means and dropping the dough pieces into the pans.

Patented Sept. 8, 1970

3,527,173

INVENTORS
WALLACE C. MULLVAIN, Sr.
JOHN JOCH, Jr.
NORMAN R. MATHEUS

BY
ATTORNEY

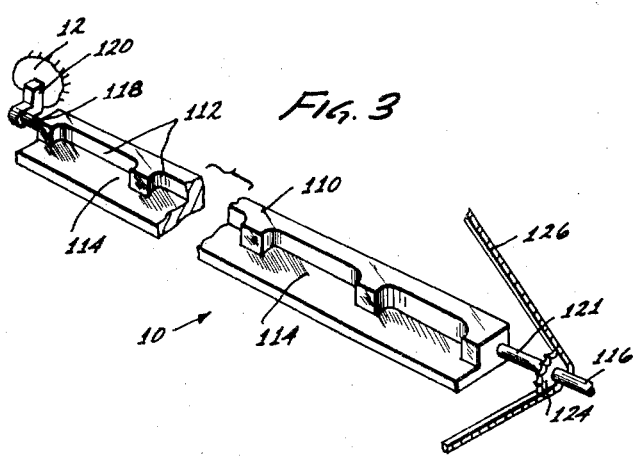
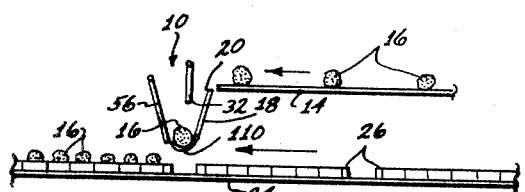
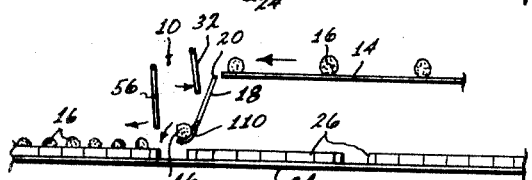
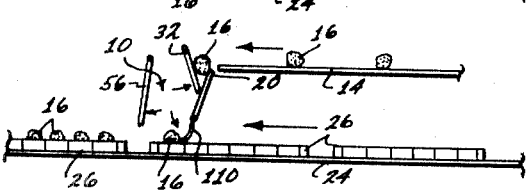
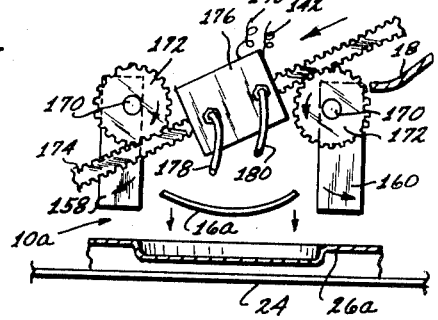
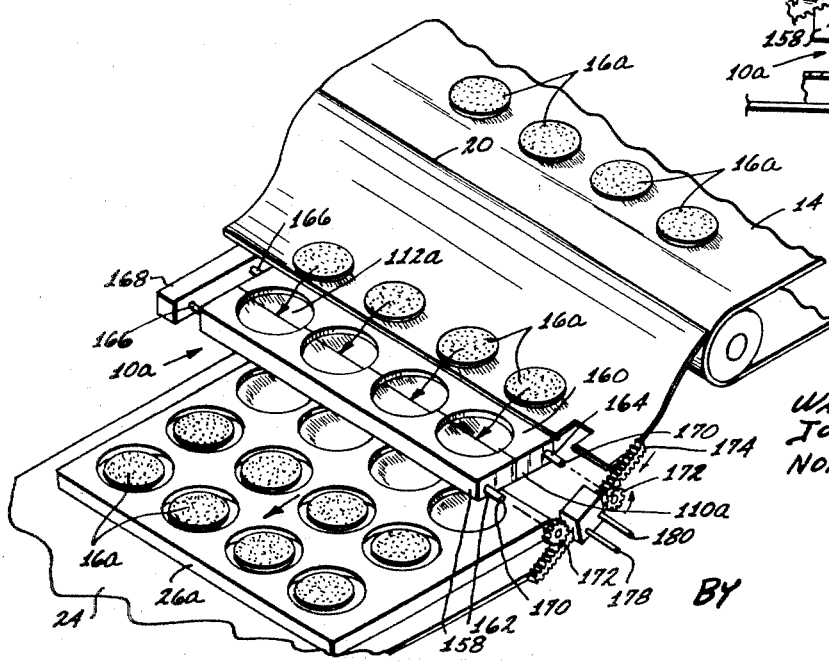

DOUGH PANNING DEVICE

A conventional dough panning machine of one well-known type includes an endless belt feeding dough pieces to a discharge chute down which the dough pieces travel to a point of discharge. At this point, a gate swings into position to arrest and align the dough pieces. The gate then opens permitting the dough pieces to fall into baking pans. The angle of the discharge chute and the distance dropped is such that the dough pieces often fall incorrectly into the pans disforming the dough pieces. This problem is especially noticeable in connection with the making of hot dog and hamburger buns.

In view of the foregoing factors and conditions characteristic of dough panning machines, it is a primary object of the present invention to provide a new and useful dough panning device not subject to the disadvantages enumerated above and having mold means especially designed for positioning dough pieces in baking pans correctly, efficiently and expeditiously.

Another object of the present invention is to provide open-topped mold means intermediate the discharge end of a dough-feeding machine discharge chute and baking pans traveling there beneath for receiving dough pieces from said discharge end and positioning them properly in said pans.

According to the present invention, open-topped mold means conforming to the shape and size of the dough pieces to be baked are rotatably mounted intermediate the discharge end of the discharge chute on a dough feeding machine and the baking pans normally moving beneath the discharge end. The mold means is rotatably mounted with the open tops normally positioned in the path of travel of the dough pieces down the chute.

Means are connected to the mold means for moving the open tops from the normal position to a discharge position over the pans.

The device also includes means for vibrating the dough pieces in the mold means to properly align the dough pieces and to remove any kinks which may have resulted when the dough pieces left the discharge end of the chute and fell into the mold.

In one embodiment of the present invention, the molds are shaped to receive dough pieces for hot dog buns.

In a second embodiment of the invention, a split mold is employed and is shaped to receive dough pieces for hamburger buns.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

FIG. 3 is an enlarged, partial perspective view of an open-topped mold means employed in the device of FIG. 1;

FIGS. 4a, 4b and 4c are reduced, side-elevational views showing, somewhat schematically, dough pieces being fed into and released from the dough panning device of the present invention;

FIG. 5 is a partial perspective view of a modified dough panning device of the present invention in combination with a conventional dough feeding machine; and FIG. 6 is an enlarged, partial elevational view of the device shown in FIG. 5 with parts shown in cross section.

Figure 1:
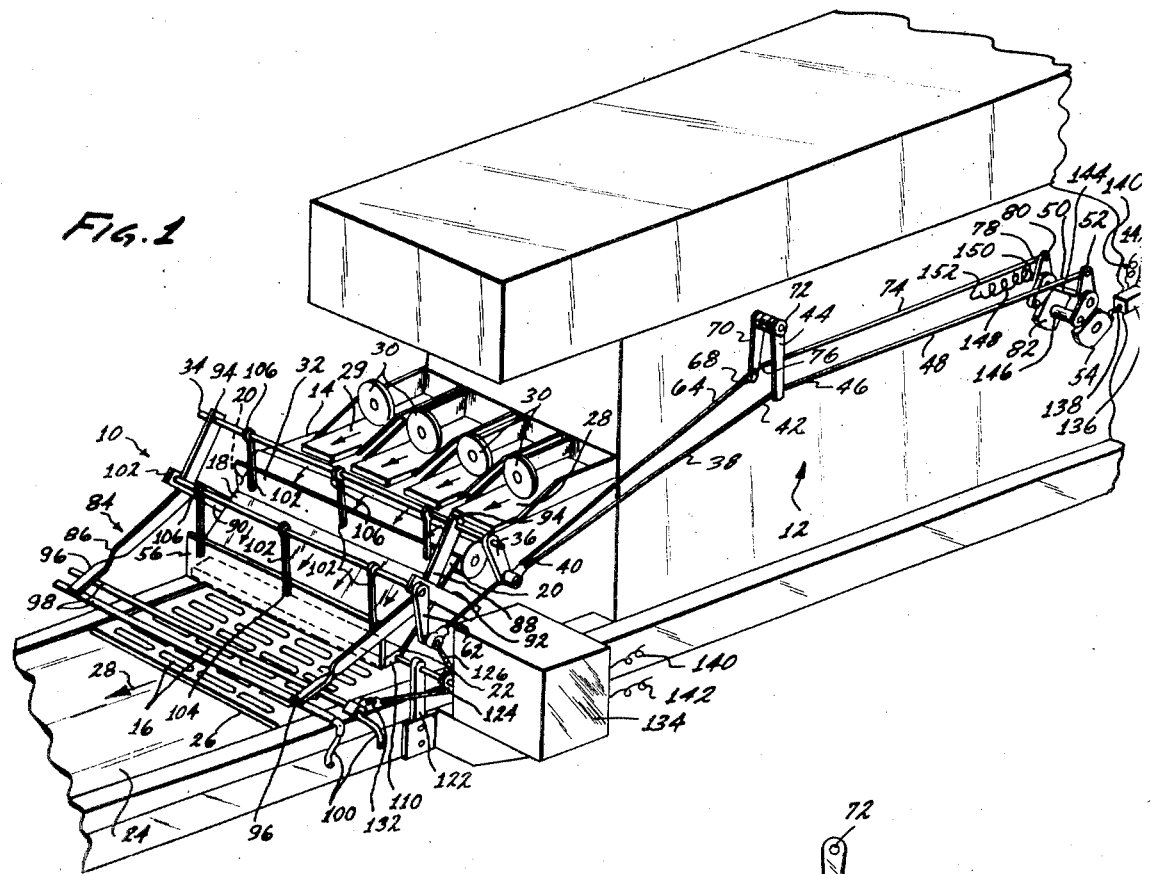
FIG. 1 is a perspective view of a dough panning device of the present invention in combination with a conventional dough feeding machine, shown somewhat schematically.

The various arrows in the drawings indicate the direction of motion of the surfaces or elements near which they are placed.

Figure 2:
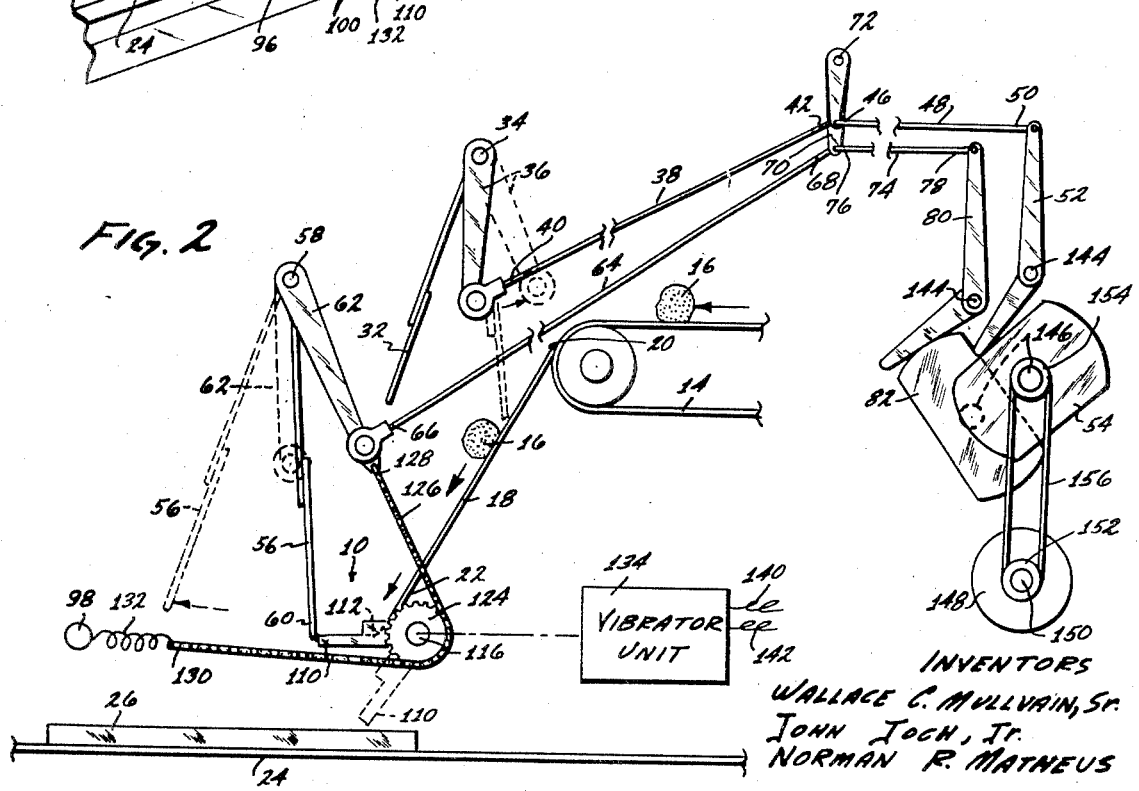
FIG. 2 is an enlarged, side elevational view of the dough panning device shown in FIG. 1.

Referring again to the drawings, and more particularly to FIG. 1, a dough panning device constituting a first embodiment of the present invention, generally designated 10, is shown in combination with a conventional dough-feeding machine 12 having an endless belt 14 feeding four dough pieces, like the one shown at 16 in FIG. 2, to a discharge chute 18 having an upstream end 20 and a discharge end 22.

Dough-feeding machine 12 includes a second conveyer belt 24 moving a strap of baking pans 26 beneath discharge end 22 in the direction of arrow 28 for receiving dough pieces 16 from chute 18 and moving them to an oven (not shown). Machine 12 forms dough pieces 16 into hot dog buns by moving dough pieces 16 beneath an associated pressure plate 28. Four pressure plates 28 are provided because machine 12 is designed to move a spread of four dough pieces 16 onto discharge chute 18. Each pressure plate 28 is mounted above belt 14 beneath an associated adjusting device 30 which may be used to adjust the pressure exerted by its associated plate 28 on dough pieces 16 for rolling them into the substantially cylindrical shape of a hot dog bun.

Machine 12 also includes a first gate 32 carried by a rod 34 at the upstream end 20 of chute 18. Gate 32 is swung to the position shown in FIG. 1 for aligning the four dough pieces 16 as they enter upstream end 20 of chute 18 by momentarily arresting dough pieces 16. Gate 32 may then be swung to the solid-line position shown in FIG. 2 by a crank 36 which is connected to rod 34. Crank 36 is swung by a push rod 38 having a first end 40 connected to crank 36 and a second end 42 connected to a swingable arm 44 rotatably mounted on machine 12. Arm 44 carries one end 46 of a second push rod 48 having a second end 50 connected to a crank 52 which is driven by a cam 54 controlling the cyclical operation of gate 32 in a well-known manner.

Machine 12 also includes a second gate 56 carried by a rod 58 at the discharge end 22 of chute 18. Conventionally, gate 56 arrests dough pieces 16 until they are again aligned after travelling down chute 18 and then releases them into pans 26. However, it is part of the present invention to position panning device 10 between the discharge end 22 of chute 18 and gate 56. Gate 56 may then be swung to the position shown in broken lines in FIG. 2 while panning device 10 discharges dough pieces 16 into pans 26 in a manner to be hereinafter described. Gate 56 is swung by a crank arm 62 which is swung by a push rod 64 having a first end 66 connected to crank 62 and a second end 68 connected to a hanger arm 70 pivotally connected to machine 12 by a pin 72. Arm 70 is swung by a push rod 74 having a first end 76 connected to arm 70 and a second end 78 connected to a crank 80 which is driven by a cam 82 controlling the cyclical operation of gate 56 in a manner to be hereinafter described.

Gates 32 and 56 are supported by a hanger assembly 84 having a pair of L-shaped arms 86, 88 connected to machine 12 by arms 90 and 92, respectively. Arms 86, 88 each has a first end 94 rotatably supporting rod 34 and a free end 96 extending over pans 26 for supporting a pair of air pipes 98 receiving air through air-supply conduits 100 for blowing loose flour from dough pieces 16 in pans 26. Arms 90, 92 each includes a free end 102 rotatably supporting rod 58. Gates 32, 56 are connected to their associated rods 34, 58 by flanges 102, each having an end 104 connected to an associated gate and an end 106 affixed to an associated rod for rotation therewith.

Referring now more in particular to FIGS. 1—3, the panning device 10 includes an open-topped mold 110 having four cavities 112 conforming in size and shape to the dough pieces 16. Cavities 112 each have an open front 114 so that dough pieces 16 may roll from cavities 112 into pans 26 when mold 110 is swung to the position shown in broken lines in FIG. 2. Mold 110 is affixed to a rod 116 having a first end 118 journalled in a bearing block 120 and a second end 121 journalled in a bracket 122, both of which are affixed to machine 12. End 121 of rod 116 carries a sprocket 124 about which a chain 126 is trained. Chain 126 has a first end 128 connected to crank 62 and a second end 130 connected to a spring 132 anchored on one of the air pipes 98. When crank 62 is swung to the position shown in broken lines in FIG. 2, chain 126 rotates sprocket 124 swinging mold 110 to the position shown in broken lines in FIG. 2 for discharging dough pieces 16 into pans 26 from mold 110. Cam 82 will then drive gate 56 back to its solid-line position and spring 132 will pull chain 126 rotating sprocket 124 counterclockwise, as viewed in FIG. 2, swinging mold 110 back to its solid-line position.

A vibrator 134 is connected to shaft 116 for vibrating mold 110 to properly position dough pieces 16 in cavities 112 and to remove any kinks or the like which may have gotten into dough pieces 16 when they fell into cavities 112. Vibrator 134 is controlled by an electric switch 136 (FIG. 1) having a switch-closing stem 138 riding on cam 54 for energizing vibrator 134 when gate 32 opens. Switch 136 is connected to vibrator 134 by electrical leads 140, 142.

Cranks 52, 80 are mounted on a common shaft 144 and the cams 54, 82 are mounted on a common shaft 146. Cranks 52, 80 are biased by a spring 148 having one end 150 connected to crank 80 and another end 152 connected to machine 12. Cams 54, 82 may be driven by an electric motor 148 having an output shaft 150 which carries a pulley 152 connected to a pulley 154 on shaft 146 by a belt 156.

Operation of the device 10 will be described in connection with FIGS. 4a, 4b and 4c. Dough pieces 16 travel on conveyer belt 14 at spaced intervals and four abreast. When dough pieces 16 reach the upstream end 20 of chute 18, they are arrested momentarily by gate 32 which is then driven to the open position shown in FIG. 4a by cam 54 so that dough pieces 16 roll down chute 18 into mold 110 and become vibrated therein by vibrator 134 which was energized by switch 136 when gate 32 swung to the open position shown in FIG. 4a. Gate 32 then swings toward a closed position, gate 56 swings to an open position and mold 110 is rotated clockwise, all as shown in FIG. 4b. Gate 32 then arrests the next group of four dough pieces 16, gate 56 swings to a fully open position and mold 110 rotates to its down position discharging dough pieces 16 into pans 26, all as shown in FIG. 4c.

A dough panning device 10a, constituting a second embodiment of the present invention, will be described in connection with FIGS. 5 and 6 wherein conveyer belt 14 transports dough pieces 16a to the upstream end 20 of chute 18 where dough pieces 16a are momentarily arrested by gate 32 as in the previous embodiment. Gate 32 then opens permitting dough pieces 16a to slide down chute 18 and into an open-topped mold 110a having cavities 112a provided therein. Cavities 112a conform in size and shape to dough pieces 16a, which, in turn, are circular shaped for making hamburger buns. Mold 110a comprises a first mold half 158 and a second mold half 160 which are carried by rods 162 and 164, respectively. Rods 162, 164 each includes a first end 166 journalled in a bearing block 168 and a second end 170 which carries a sprocket 172. Sprockets 172 are connected together by a rack 174 which is reciprocated by an air-activated cylinder 176 receiving air through conduits 178, 180. Motor 176 is controlled by switch 136 (FIG. 1) and is connected thereto by electrical leads 140, 142. Thus, mold halves 158, 160 will be swung to the positions shown in FIG. 6 when gate 56 moves to the broken-line position shown in FIG. 2. This permits dough pieces 16a to drop into a strap of pans 26a travelling beneath mold 110a on belt 24. It is to be understood that the vibrator 134 will be attached to shaft 164 in the second embodiment of the present invention.

While the particular dough panning devices herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims, which form a part of this disclosure.

We claim:

1. In combination with a dough feeding machine including a discharge chute having a discharge end for discharging dough pieces into baking pans positionable below said discharge end, means for positioning said dough pieces in said pans, comprising:
    mold means having at least one cavity conforming in size and shape substantially to the size and shape of said dough pieces;
    means movably mounting said mold means intermediate said discharge end and said pans, said cavity being normally positioned in the path of travel of dough pieces leaving said discharge end; and
    means connected to said mold means for moving said cavity from said normal position to a discharge position over said pans.

2. A combination as stated in claim 1 including vibrator means connected to said mold means for vibrating said dough pieces in said cavity.

3. A combination as stated in claim 1 wherein said cavity conforms in size and shape substantially to the size and shape of a wiener bun.

4. A combination as stated in claim 1 wherein said cavity conforms in size and shape substantially to the size and shape of a hamburger.

5. A combination as stated in claim 4 wherein said mold means comprises two mold halves each having a semi-cylindrical cavity, said moving means including means for swinging said mold halves simultaneously downwardly toward said pans.

6. A combination as stated in claim 1 wherein said dough feeding machine includes a lower gate controlling the discharge of said dough pieces and means for swinging said gate cyclically from a normal position against said discharge end to an open position away from said discharge end, said mold means being rotatably mounted between said gate and said discharge end, whereby said gate normally rests against said mold means, and wherein said moving means is connected to said gate for actuation thereby to rotate said mold means.

7. A combination as stated in claim 6 wherein said dough feeding machine includes crank means for swinging said gate, wherein said mold means is carried by a rotatable shaft having wheel means connected thereto for rotating said shaft and wherein said moving means includes means connected to said crank means and trained about said wheel means for rotating said shaft when said crank means is swung to move said gate away from its normal position against said mold means.

8. A combination as stated in claim 1 wherein said dough feeding machine includes a lower gate controlling the discharge of said dough pieces and cam-controlled push-rod means for swinging said gate cyclically from a normal position against said discharge end to an open position away from said discharge end, said mold means being rotatably mounted between said gate and said discharge end, whereby said gate normally rests against said mold means, and wherein said moving means includes motor means controlled by said cam for swinging said mold means to discharge dough pieces into said pans each time said gate is swung to said open position.

9. A combination as stated in claim 3 wherein said cavity includes an open top and an open front.